March 2, 1971 G. L. COULTER 3,566,541
PROTECTIVE BARRIER FOR PRODUCTS OF COMBUSTION
Filed March 6, 1969 5 Sheets-Sheet 1

INVENTOR
Gordon L. Coulter

By A. G. Douras
ATTORNEY

March 2, 1971 G. L. COULTER 3,566,541
PROTECTIVE BARRIER FOR PRODUCTS OF COMBUSTION
Filed March 6, 1969 5 Sheets-Sheet 3

INVENTOR
Gordon L. Coulter

ATTORNEY

March 2, 1971  G. L. COULTER  3,566,541
PROTECTIVE BARRIER FOR PRODUCTS OF COMBUSTION
Filed March 6, 1969  5 Sheets-Sheet 4

INVENTOR
Gordon L. Coulter

By A. G. Douvas
ATTORNEY

March 2, 1971  G. L. COULTER  3,566,541
PROTECTIVE BARRIER FOR PRODUCTS OF COMBUSTION
Filed March 6, 1969  5 Sheets-Sheet 5

INVENTOR
Gordon L. Coulter

By A. G. Douvas
ATTORNEY

United States Patent Office 3,566,541
Patented Mar. 2, 1971

3,566,541
PROTECTIVE BARRIER FOR PRODUCTS OF COMBUSTION
Gordon L. Coulter, Arlington Heights, Ill., assignor to Rixson, Inc., Franklin Park, Ill.
Filed Mar. 6, 1969, Ser. No. 804,816
Int. Cl. E06b 7/23
U.S. Cl. 49—475                 26 Claims

ABSTRACT OF THE DISCLOSURE

A protective barrier for the products of combustion adapted for installation in any structural environment having an air gap, or in which an air gap will be readily created in response to fire. The barrier features in combination a mechanical smoke seal, such as a soft compressible neoprene gasket, and a closely associated strip or mass of intumescent fire retardant coating. This barrier may be applied to a door, door frame and threshold, windows, louvers, transoms, dampers, containers, and smoke hatch covers, for example, to prevent the ready passage of the products of combustion, particularly smoke, through any structural gaps.

---

In the installation of the barrier to a door-jamb combination, the barrier is applied to the entire periphery of the door, or alternatively to the jamb and threshold areas adjacent the door. The soft compressible gasket blocks the flow of smoke ladened air under fire pressure from being forced through the air space about the periphery of the door. This is an effective smoke stop in the absence of elevated temperatures. If the door should be exposed to fire temperatures or actual flame impingement, the fire retardant coating intumesces providing insulation for the mechanical gasket and automatically fills the air gap around the door. Intumescence takes place before the mechanical gasket loses its integrity.

BACKGROUND OF THE INVENTION

Field of invention

The present invention arises from the need to provide improved safety from fire and its induced products of combustion to minimize the loss of life and property.

In many situations, the extreme pressures generated by localized fires causes smoke to pass through the air gaps surrounding closed doors, transoms, dampers, etc., to fill corridors and other egress routes with suffocating smoke to make escape difficult, if not impossible.

A primary object of this invention is to provide an effective barrier which will confine the products of combustion to the localized area of a fire, with all of the obvious resulting advantages.

DESCRIPTION OF THE PRIOR ART

The prior art is prolific in its disclosure of objects, particularly construction materials, to which a fire-retardant coating which will "intumesce" has been applied. By "intumesce" is meant the property of frothing or puffing in such a manner as to produce a considerable swollen, solid or semi-solid cellular residue, which in itself is practically non-combustible. Such residue is sufficiently continuous and adherent to protect the coated object from combustion or the deleterious effects of heat. This result is generally accomplished by preventing access of air to the coated object and at the same time protectively insulating the coated object from heat.

Intumescent coated construction materials are described in U.S. Pats. 2,632,743, 2,813,406, 2,912,393, 3,320,087, 3,336,153 and 3,365,322, for example. A temperature responsive mechanical bi-metal seal is shown in U.S. Pat. 3,127,182.

Mechanical seals and gaskets, which will act as a barrier to the products of combustion, until destroyed, are shown in U.S. Pats. 2,248,719, 2,825,941, 3,041,682, 3,149,845 and 3,246,593, for example.

Thus, while the prior art discloses that intumescent coated materials have been employed extensively as fire retardants, and that mechanical seals of many variations have been used to isolate fluids, such as smoke, there is a complete absence of any art suggesting the use of a mechanical seal in combination with a closely associated intumescent fire retardant and insulating strip which will protect the integrity of the mechanical seal in the presence of elevated temperatures caused by fire.

SUMMARY OF THE INVENTION

This invention in its most elementary and preferred aspect comprises a mechanical gasket which is protectively associated adjacent one strip or between two strips of intumescent coatings; or alternatively the intumescent coating may be intimately associated in direct contact with the mechanical gasket. This combination is applied to the peripheral edges of doors, either to the door itself or to the frame and threshold adjacent the door, also to fire and/or smoke dampers, or comfort control dampers and louvers, container lids, and smoke hatch covers, for example.

At low temperatures induced by fire, the mechanical seal, which is made of neoprene, will maintain its integrity up to about 400° F.; however, prior to the attainment of this destructive temperature, the intumescent strip will foam at about 150° F. creating a further mechanical seal between the fire and the mechanical gasket which insulates the gasket and prevents its ready destruction. Additionally, the strip after intumescence acts to confine the products of combustion to the local area of the fire.

The embodiment employing two intumescent strips is used in those environments in which a fire may occur on either side of the adjacent mechanical seal. The embodiment employing a single intumescent strip is used in those environments in which a fire may occur on one side of the adjacent mechanical seal. The several embodiments each employing an intumescent coating in intimate or direct contact with the mechanical gasket, are used where early disintegration of the gasket is permissible due to the substitute sealing effect of the intumescent coating.

DESCRIPTION OF THE DRAWINGS

In order that all of the structural features for attaining the objects of this invention may be readily understood, reference is herein made to the following drawings wherein.

DETAILED DESCRIPTION OF THE INVENTION

Figures 1, 2, 3, 4:
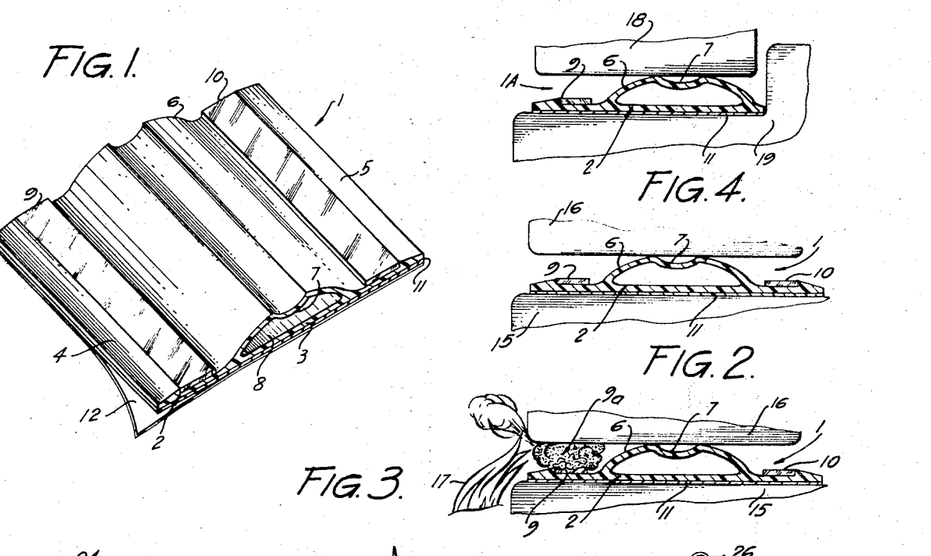
FIG. 1 is a perspective view of a first basic embodiment of the protective barrier of this invention employing an extruded plastic body which acts both as a gasket seal and as the support for two intumescent strips.
FIG. 2 is an elevational view showing the protective barrier of FIG. 1 disposed in a structural gap.
FIG. 3 is a view of the structure of FIG. 2 showing the intumescence of one of the strips in response to flame inpingement.
FIG. 4 shows a modification of the protective barrier of FIG. 1, disposed in a structural gap and employing a single intumescent strip.

Referring to FIG. 1, the first basic embodiment of the protective barrier of this invention is shown therein. This protective barrier 1 comprises an extruded plastic body which is preferably fabricated from a pliable and flexible plastic such as neoprene, which has a flame disintegration temperature of the order of 400° F.

Extruded plastic body 2 includes a flat support section 3, projecting tapered shoulders 4 and 5, and a projecting seal 6 which is formed with a concave portion 7. An irregular hollow bore 8 is created between projecting seal 6 and the adjacent underlying portions of flat support 3.

Intumescent strips 9 and 10 are fixedly applied adjacent the recesses established by projecting shoulders 4 and 5, respectively. These strips may be constructed, for example, in accordance with the teachings of U.S. Pat. 3,336,153, issued to W. Juda on Aug. 15, 1967. As taught in this patent, the intumescent coating composition therein is pliable and has an intumescing temperature of the order of 200° F., or less, which is substantially below the disintegration temperature of neoprene body 2.

Intumescent strips 9 and 10 are fixedly adhered to the contacting sections of flat support 3 by a temperature stable adhesive (not shown) in the cross-sectional views of the drawings.

Alternatively, intumescent strips 9 and 10 need not be prefabricated strips having an adhesive as is taught in Pat. 3,336,153 but rather may be fabricated of any of the intumescent materials known in the prior art to which a plasticizer may be preferably added. These materials are usually liquid in form prior to application and may be applied by brush or by use of a spray or roller, as is desired.

A temperature stable adhesive layer 11 is applied to the lower surface of flat support 3. Adhesive layer 11 is protectively isolated by means of paper backing 12, which is easily removable by manual separation, when it is desired to apply protective barrier 1 to a particular structure.

FIG. 2 shows the application of protective barrier 1 to a narrow structural gap defined by elements 15 and 16. In this application, paper backing 12 is removed and adhesive layer 11 establishes firm and fixed contact with the top surface of element 15. The uppermost portions of projecting seal 6 establish contact with the lower surface of element 16 in such a manner that the seal acts as a mechanical gasket isolating the left and right portions of the air gap otherwise appearing between structural elements 15 and 16.

In FIG. 3, protective barrier 1 and structural elements 15 and 16 are subjected to fire 17 which occurs on the left side of the structural elements. As flame 17 elevates intumescent strip 9 to its intumescing temperature, the strip froths or puffs in the characteristic manner so as to produce a considerably swollen, solid or semi-solid cellular residue 9a which acts as a protective insulation seal for the gasket established by mechanical seal 6. Additionally, cellular residue 9a establishes a further seal which prohibits the passage of the products of combustion emanating from flame 17 through the structural gap between elements 15 and 16.

While not shown in FIG. 3, had flame 17 occurred on the right side of structural elements 15 and 16, intumescent strip 10 would have intumesced in the characteristic manner to produce a cellular residue which would correspond to that of 9a; and thus isolate the mechanical gasket formed by seal 6 from a fire from the right side.

FIG. 4 shows a modified protective barrier 1A, which is basically identical to protective barrier 1, with the single exception that intumescent strip 10 has been eliminated together with its underlying support structure. Modified protective barrier 1A may be advantageously employed in those structural environments in which a fire may occur from only a single direction. In particular, it is assumed that structural elements 18 and 19 are so disposed that a fire may occur only from the left side of elements 18 and 19. In this situation, it may be readily appreciated that only intumescent strip 10 shown in FIGS. 1 thru 3 is surplus, as strip 10 will not be subjected to a fire.

Figures 5, 7:
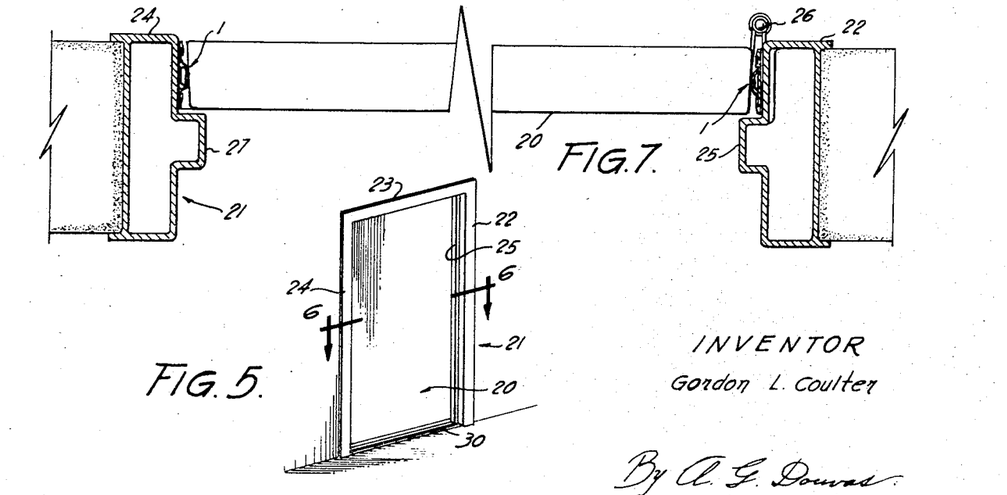
FIG. 5 is a perspective view of a panel door and its frame, which is of assistance in understanding the application of the protective barrier of this invention to the door-frame combinations of FIGS. 6 and 7.
FIG. 7 is a modification of FIG. 6 showing the application of the protective barrier to the jambs of the door frame.

FIG. 5 shows a perspective view of a typical panel door and its frame. This view is of assistance in understanding the application of protective barrier 1 to the door-frame combinations of FIGS. 6 and 7. In FIG. 5, panel door 20 is supported by butt hinges (not shown) relative frame 21 which comprises right jamb 22, head 23 and left jamb 24. Right stop 25 is an integral part of right jamb 22 as shown in this figure.

Figure 6:
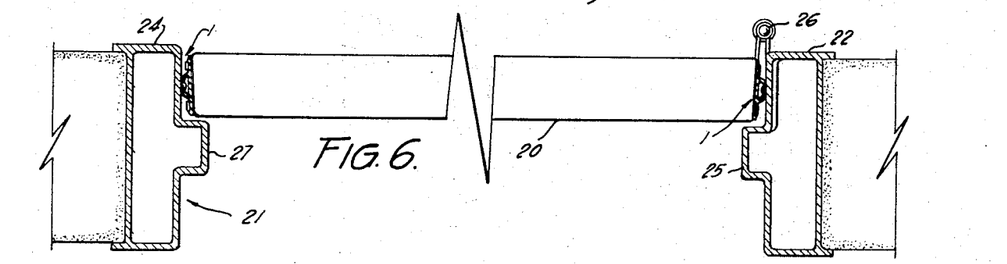
FIG. 6 is a sectional view taken along line 6—6 of FIG. 5 and showing the application of the protective barrier of FIG. 1 to the peripheral edges of a panel door hinged relative a door frame.

Referring now to FIG. 6, which is a sectional view taken along line 6—6 of FIG. 5, panel door 20 is supported on right jamb 22 by means of a plurality of butt hinges only one of which 26 is shown. Panel door 20 rests against stops 25 and 27 in the closed position of door 20.

FIG. 6 shows the application of protective barrier 1 to the left and right vertical edges of panel door 20. However, in order that a completely effective protective barrier may be established, protective barrier 1 must also be applied to the top and bottom of door 20, which application is not shown in FIG. 6. This disposition of protective barrier 1 around the complete periphery of panel door 20 forms a complete mechanical gasket blocking the air space otherwise appearing between the door, and the frame and the threshold. In the event of fire occurring on either side of panel door 20, intumescent strip 9 or 10 immediately adjacent the fire intumesces as previously explained with reference to FIG. 3, so as to provide heat insulation for the mechanical gasket and also a further seal against the passage of the products of combustion.

FIG. 7 is also a sectional view taken along line 6—6 of FIG. 5. In FIG. 7, however, protective barrier 1 is applied to the jambs 22 and 24, and also head 23 (not shown). It will be noted that in FIG. 7, the application of protective barrier 1 differs only in that the door frame supports protective barrier 1, whereas, in FIG. 6 the peripheral edges of panel door 20 support the protective barrier. Inasmuch as in FIG. 7, the door frame does not extend under the bottom of the panel door, protection for the air gap appearing between the bottom of the door and threshold 30 (FIG. 5) must be provided by the threshold modification of the protective barrier of this invention shown in FIG. 8.

Figures 8, 11:
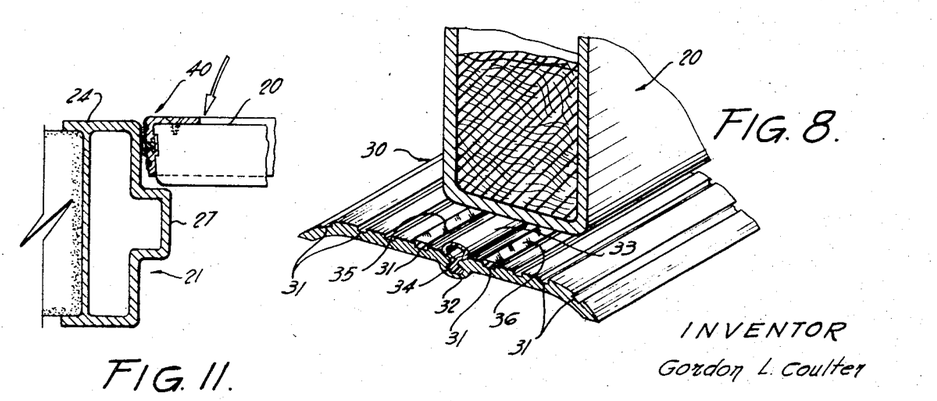
FIG. 8 shows the application of a further modification of the protective barrier of this invention to a door threshold.
FIG. 11 is a sectional view showing the application of the protective barrier of FIG. 9 to the peripheral edges of a panel door in a closed position relative a door frame.

In FIG. 8, metallic threshold 30 is formed with a plurality of grooves 31 and a centrally disposed T-slotted channel 32. Mechanical seal 33, which acts as a protective gasket is formed with a T-flange 34, which is received by channel 32 so as to position fixedly the seal. Intumescent strips 35 and 36 are disposed in the pair of grooves immediately adjacent seal 33.

In this application, seal 33 makes contact with the bottom edge of panel door 20 so as to establish a mechanical gasket which acts as a barrier to the air gap otherwise appearing between the bottom of panel door 20 and the threshold. Intumescent strips 35 and 36 form protective functions which are identical to intumescent strips 9 and 10 of protective barrier 1 shown in FIGS. 1 through 3.

Figure 9:
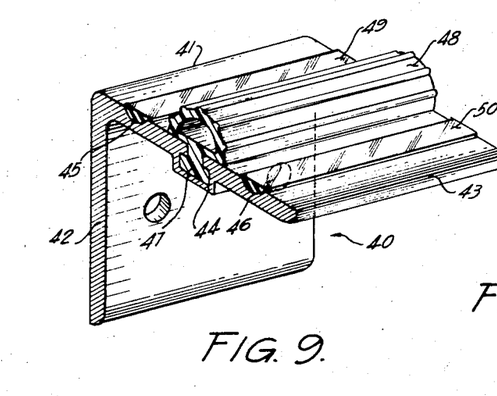
FIG. 9 is a perspective view of a second basic embodiment of the protective barrier of this invention employing an equal-leg angle as a support for a gasket seal sandwiched between two intumescent strips.

A second basic embodiment of the protective barrier of this invention is shown in FIG. 9. Protective barrier 40 comprises an equal-leg angle 41 having legs 42 and 43. Leg 43 acts as a support for the protective barrier, and this leg is formed with a T-slotted channel 44 and a pair of grooves 45 and 46. T-flange 47 is housed within channel 44, and this flange fixedly carries ribbed seal 48 with respect to support leg 43. Intumescent strips 49 and 50 are located within grooves 45 and 46, respectively.

Basically, the operative function of protective barrier 40 is exactly the same as that of FIG. 1. It should be noted, however, that inasmuch as protective barrier 40 is a structural angle, application to particular objects, such as doors, will be different from that of protective barrier 1.

Figure 10:
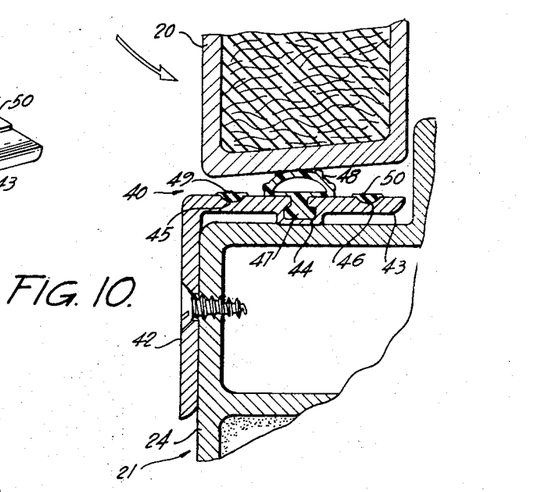
FIG. 10 is a sectional view showing the application of the protective barrier of FIG. 9 to a door jamb.

In FIG. 10, protective barrier 40 is shown applied to jamb 24 in such a manner that seal 48 acts as a gasket between panel door 20 and leg 43 of angle 41. Intumescent strips 45 and 46, which sandwich seal 48 are operative in a manner identical to intumescent strips 9 and 10 of protective barrier 1 shown in FIGS. 1 through 3.

In FIG. 11, protective barrier 40 is shown applied to the peripheral edges of panel door 20. In order that the entire periphery of the door may be sealed relative its frame and adjacent floor structure, protective barrier 40 should be applied to both vertical edges and also to the top and bottom of the door. With this arrangement, a continuous gasket is established between the door and its adjacent structure.

Figure 12:
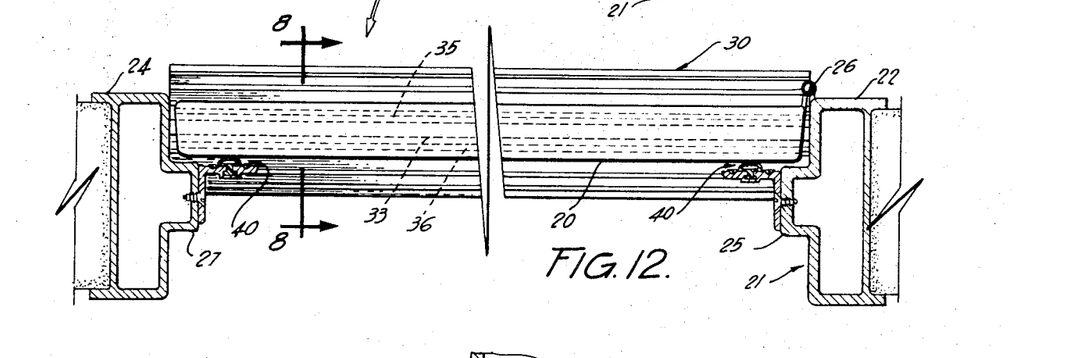
FIG. 12 is a horizontal sectional view showing the application of the protective barrier of FIG. 9 to a door stop, and including the threshold barrier of FIG. 8.

In FIG. 12, protective barrier 40 is applied to stops 25 and 27 of door jambs 22 and 24, respectively. Additionally, protective barrier 40 is applied to the stop (not shown) for frame head 23 (FIG. 5) so that a continuous seal is made with respect to panel door 20. Additionally, in this particular arrangement the threshold barrier shown in FIG. 8 is also applied to the bottom of the door so that a sealing gasket is established in the air gap normally existing between the bottom of the door and the floor. Thus, by the use of protective barrier 40 to seal the sides and top of the door, and threshold seal 30 to seal the bottom of the door, a continuous protective barrier is effected.

Figure 13:
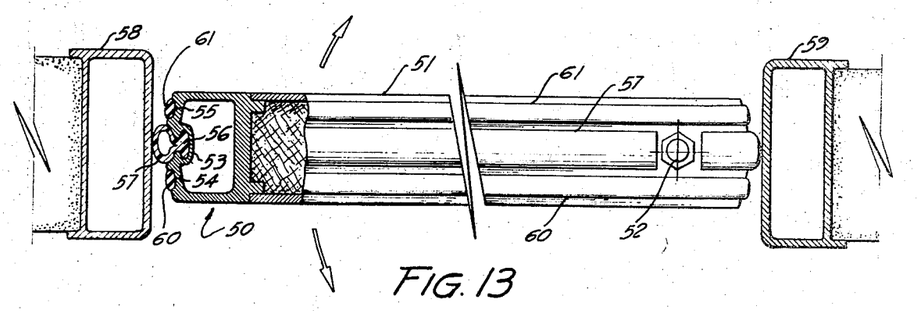
FIG. 13 is a top view, partly in section, showing the application of the protective barrier of this invention to a peripheral channel which is an integral part of a center-hung panel door.

FIG. 13 is a top view, partly in section, showing the application of a modified protective barrier of this invention to a peripheral channel 50 which is an integral part of a center-hung panel door 51 which pivots on pivot 52. Channel 50 is formed with a T-slot 53 and a pair of grooves 54 and 55. T-flange 56 is received within T-slot 53 so as to fix seal 57 relative left jamb 58 and right jamb 59 and also the head of the frame (not shown). Inasmuch as seal 57 forms a continuous gasket with respect to the adjacent frame and floor, a complete protective barrier is formed around the door frame. Seal 57 is protected by intumescent strips 60 and 61. These strips perform a function which is identical to that of strips 9 and 10 of protective barrier 1 shown in FIGS. 1 through 3.

Figures 14, 15:
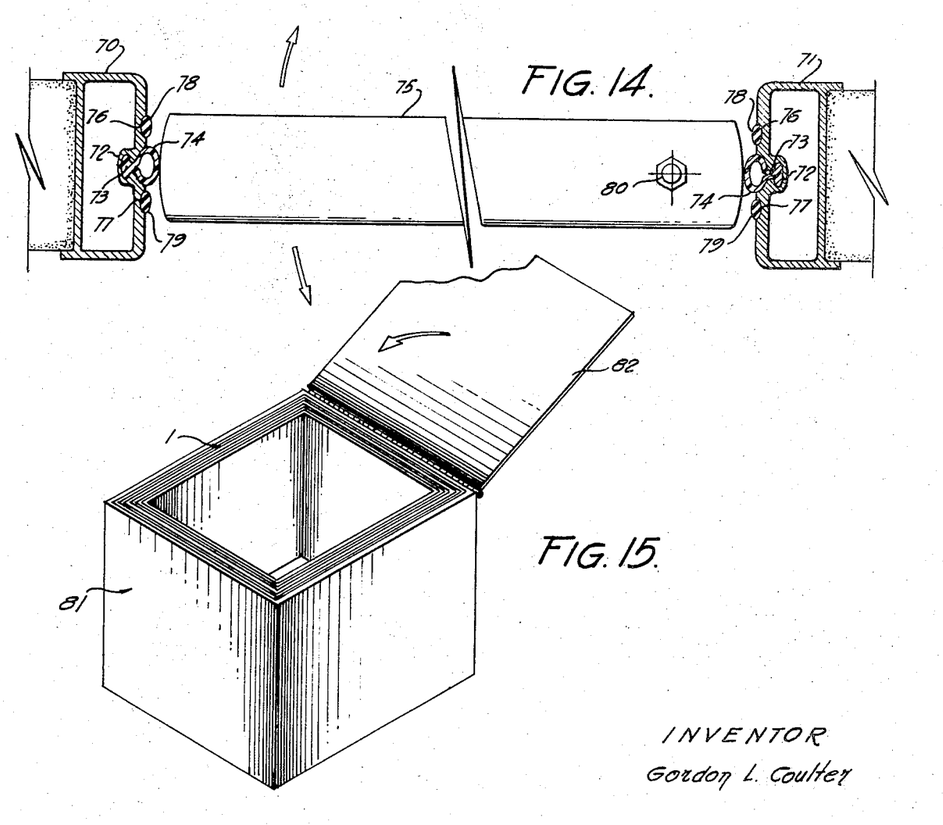
FIG. 14 is a top view, partly in section, showing the application of the protective barrier of this invention to a channel which is an integral part of a door frame.
FIG. 15 is a perspective view showing the application of the protective barrier of FIG. 1 to a box having a hinged lid.

FIG. 14 is a top view, partly in section, showing the application of a modified form of the protective barrier of this invention to left jamb 70, right jamb 71, and also the head of the frame (not shown). In this application, both jambs and the head are formed with a T-slotted channel 72 which receives T-flange 73. T-flange 73 supports seal 74 in a fixed position relative door 75 so that a mechanical gasket is established along both vertical edges and the top of the door. Jambs 70 and 71 and also the head of the frame (not shown), are formed with grooves 76 and 77 which receive intumescent strips 78 and 79, respectively. Intumescent strips 78 and 79 perform a function which is identical to that of the strips 9 and 10 of protective barrier 1 shown in FIGS. 1 through 3. In this arrangement center hung door 75 is pivoted on pivot 80.

FIG. 15 shows the application of protective barrier 1 of FIGS. 1 through 3, to a box 81 having a hinged lid 82. The protective barrier is applied to the top edge of all sides of box 81. When lid 82 closes the top of the box, protective barrier 1 acts as an effective gasket to seal the products of combustion occurring either within the box or outside of the box.

As an alternative arrangement, not shown in the drawings, protective barrier 1 could be applied to the bottom side of lid 82 so as to accomplish an identical protective function.

Figures 16, 17, 18, 19, 20, 21, 22:
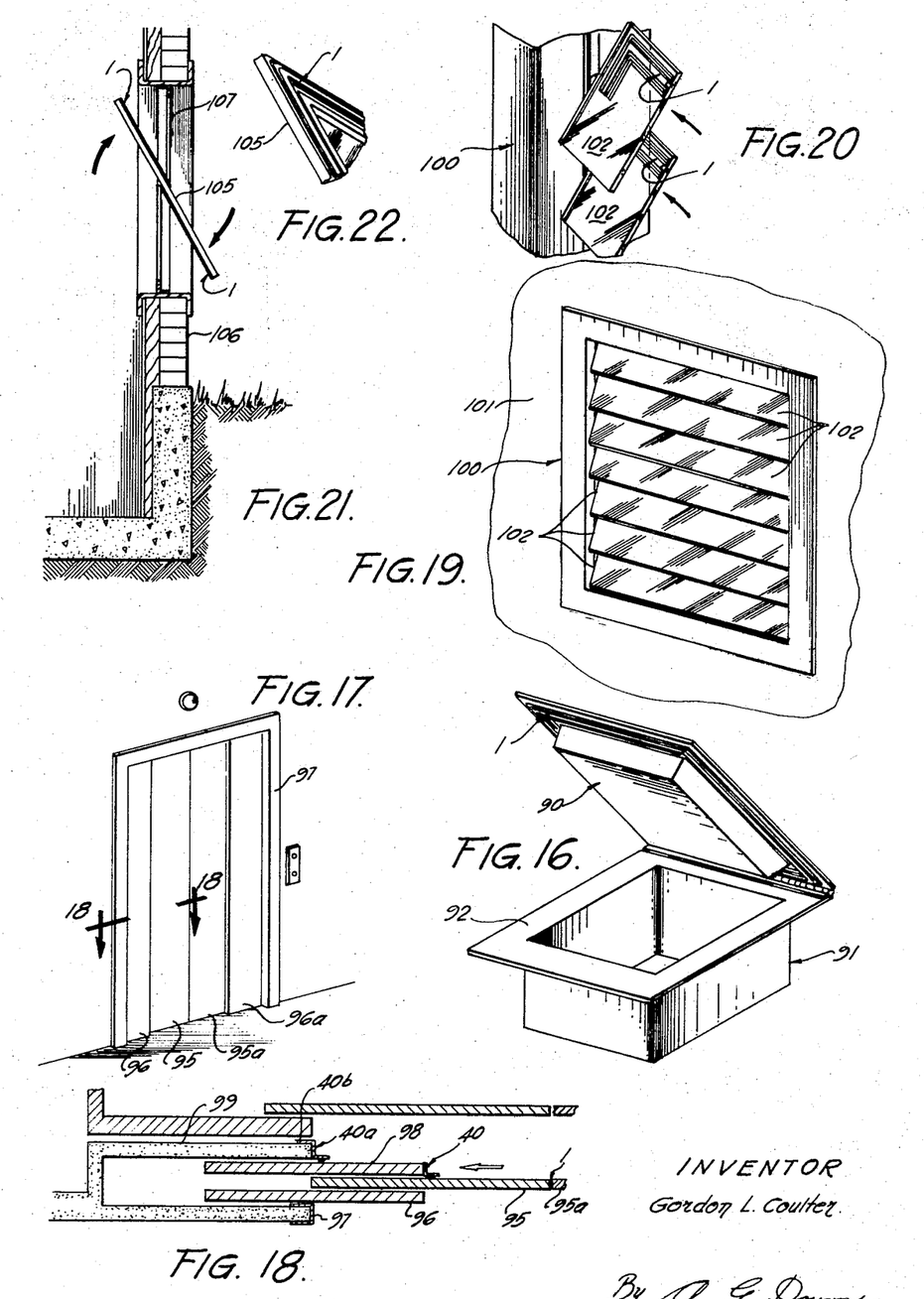
FIG. 16 is a perspective view showing the application of the protective barrier of FIG. 1 to the cover of a smoke hatch.
FIG. 17 is a perspective view of an elevator hatchway door.
FIG. 18 is a sectional view taken along line 18—18 of FIG. 17 showing the application of the protective barrier of this invention to the elevator hatchway door of FIG. 17.
FIG. 19 is a perspective view of a damper having a plurality of louvers.
FIG. 20 is a fragmentary perspective view showing the application of the protective barrier of FIG. 1 to the louvers of FIG. 19.
FIG. 21 is an elevation view, partly in section, showing a center pivoted window for a building employing the protective barrier of FIG. 1.
FIG. 22 is a fragmentary perspective view showing the application of the barrier of FIG. 1 to the window of FIG. 21.

FIG. 16 is a perspective view showing the application of protective barrier 1 to cover 90 for smoke hatch 91. When cover 90 is firmly seated within the hatch opening so that protective barrier 1 rests tightly against hatch flange 92, an effective mechanical gasket is established between cover 90 and smoke hatch 91. The intumescent strips of protective barrier 1 performs a function which is identical to that of strips 9 and 10 shown in FIGS. 1 through 3.

FIG. 17 is a perspective view of an elevator employing retractable hatchway doors 95 and 96 associated with frame 97. As is shown in the sectional view of FIG. 18, protective barrier 1 is applied to the vertical edge of door 95 so that an effective gasket seal is established with the associated door 95a. Additionally, protective barrier 40 (shown in FIG. 9) is applied to the vertical edge of hatchway door 98 so as to establish an effective seal between door 98 and door 95. A modified barrier 40a, having an additional leg 40b, is applied to wall 99 so as to establish a seal between this wall and hatchway door 98.

FIG. 19 is a perspective view of a damper or ventilator 100 installed in fire wall 101. Damper 100 employs a plurality of adjustable louvers 102. As is shown in FIG. 20, protective barrier 1 is applied to each of louvers 102 so that when the louvers are closed a mechanical gasket seal is established between each of the louvers. The protective functions of intumescent strips 9 and 10 are identical to that previously explained with reference to FIGS. 1 through 3.

FIG. 21 is an elevation view, partially in section, showing a center pivoted window 105 installed in a building wall 106. As is shown in FIGS. 21 and 22, protective barrier 1 is applied to window 105 so that an effective gasket seal is established between the window and its frame 107.

In certain applications where delayed protection is acceptable, mechanical sealing gaskets may be eliminated. A single intumescent strip may be applied to one surface defining a narrow air gap through which the products of combustion should not continuously pass. After the strip attains its intumescing temperature, intumescence occurs closing the air gap to passage of further products of combustion.

Figure 23:
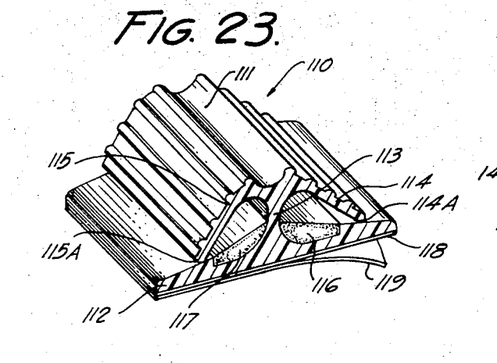
FIGS. 23 through 28 are generally sectional views showing several embodiments in which each employs an intumescent coating in direct contact with a mechanical gasket.

FIG. 23 is a perspective view showing in cross-section a preferred embodiment of a protective barrier in which the intumescent masses are in intimate contact with the sealing gasket. By this arrangement, the application of a single mechanical resilient seal achieves the protective functions of this invention. This obviously results in a simplified and more economic installation.

Figure 24:
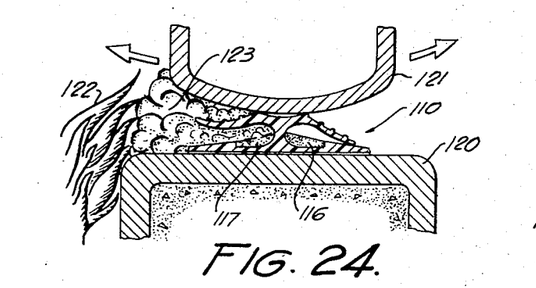

FIG. 24 shows the application of the protective barrier of FIG. 23 to a jamb associated with a swinging door.

Referring now to FIGS. 23 and 24, the protective barrier 110 is formed from an extruded plastic body 111 which is resilient so as to form an accommodating seal. Plastic body 111 includes a base 112, a center support 113 and two side flaps 114 and 115.

An adhesive layer 118 is applied to the underside of base 112, and this layer is covered by protective paper backing 119. The cavity formed by side flap 114 and base 112 is partially filled by the intumescent mass or strip 116; and the cavity formed by side flap 115 and base 112 is partially filled by intumescent mass or strip 117.

The lower portions of side flaps 114 and 115 establish sliding contact openings 114A and 115A with respect to base 112.

In the event that protective barrier 110 is subjected to an elevated temperature, masses 116 and 117 intumesce filling their respective cavities and lifting the associated flaps so that overflow frothing occurs at opening 114A and 115B. This intumescing function enables the intumescent masses to seal any portion of plastic body 111 which disintegrates in response to destructive temperatures.

FIG. 24 shows the application of protective barrier 110 to door frame 120, which defines a passageway for swinging door 121. In the sealing position of the door shown in FIG. 24, plastic body 111 is compressed to effectively seal the gap between the adjacent portions of door 121 and frame 120. This compression causes a sliding movement of side flaps 114 and 115 relative the adjacent base area 112 as previously described.

In the event a fire occurs (for example, fire 122 on the left side of door frame 120), intumescent mass 117 froths in the characteristic manner flowing through the opening 115A which may or may not be enlarged by barrier disintegration caused by the fire. Frothing 123 generated from mass 117 effectively seals that portion of the protective barrier 110 which disintegrates.

It should be noted that the embodiment of the protective barrier shown in FIGS. 23 and 24 provides an open housing or cavity for intumescent masses 116 and 117, through which housing the frothing foam may readily flow.

Figure 25:
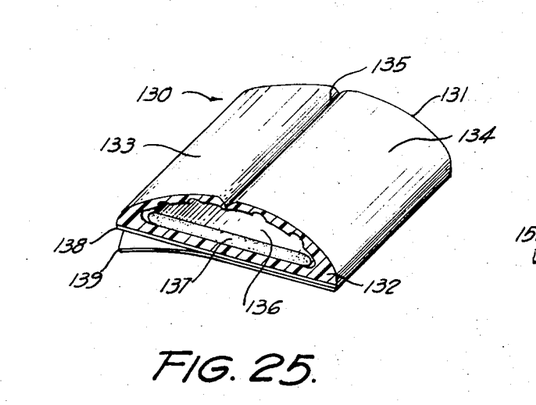

FIG. 25 shows another embodiment of the protective barrier of this invention in which the intumescent mass is in intimate contact with the mechanical seal. The intumescent mass is also located within an open housing or cavity in this embodiment so that the frothing thereof may readily flow through the seal in response to a fire.

In particular, protective barrier 130 comprises an extruded plastic body 131 which has a base 132 supporting curved lips 133 and 134. Lips 133 and 134 frictionally contact one another along closed opening 135; however, relative movement of one of the lips with respect to the other enlarges the opening for the otherwise closed cavity 136. A strip or mass of intumescent material 137 is supported on the upper surface of base 132. The lower surface of base 132 carries an adhesive layer 138 and a protective paper backing 139.

Protective barrier 130 is applied to a door frame or other supporting surface adjacent a narrow gap much in the same manner as protective barrier 110 is applied to door frame 120 (see FIG. 24). That is, paper backing 139 is removed and protective barrier 130 is fixed relative its support by means of adhesive 138.

In the event protective barrier 130 is subjected to excessive temperature, intumescent mass or strip 137 froths in the characteristic manner, and the resultant foam emerges from opening 135 or any other portion of the plastic body 131 which has disintegrated in response to the excessive temperature. By this action, the foam insures the seal of the gap to which the protective barrier 130 is applied.

Figure 26:
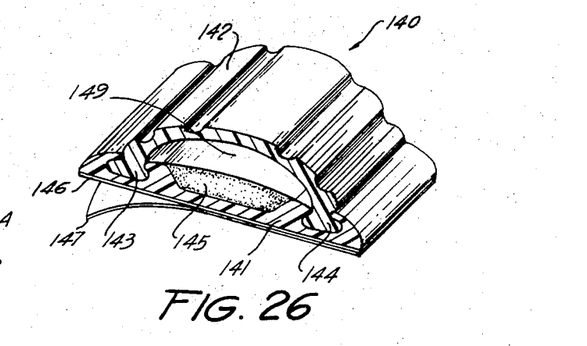
Figure 27:
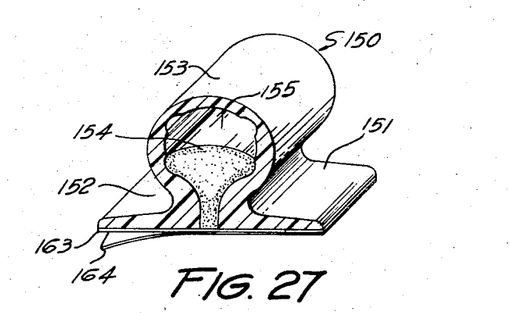
Figure 28:
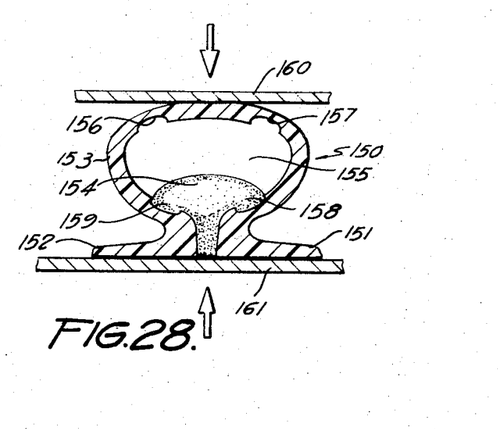

The structures of FIGS. 23, 24 and 25 all show protective barriers in which the intumescent mass is housed within a cavity formed by an openable housing. The structure shown in FIGS. 26, 27 and 28 show embodiments in which the intumescent masses are contained within cavities created by closed housings; that is, the plastic bodies of the protective barriers are designed so that no opening is provided through which the intumescent mass may emerge. However, after disintegration of a portion of the plastic bodies of these barriers due to excessive heat, an opening is formed through which the housed intumescent mass may emerge to produce the characteristic insulating seal.

Referring now to the protective barrier 140 shown in FIG. 26, this barrier comprises an extruded plastic body formed into two sections which are mechanically locked with respect to one another. In particular, the plastic body comprises base 141 and circular cover 142. Circular cover 142 is formed with terminal flanges 143 and 144 which lock in mating grooves formed in base 141. This flange arrangement enables ready assembly of cover 142 to base 141.

The closed cavity 149 formed by base 141 and cover 142 contains intumescent mass 145. It should be noted that cavity 144 is not completely filled by intumescent mass 145 so that the normal flexing of cover 142 caused by door closure, for example, does not disturb the intumescent mass 145.

When protective barrier 140 is subjected to excessive heat, the intumescent mass 145 froths, thereby expanding and emerging from any rupture in circular cover 142 caused by disintegration.

Protective barrier 140 is applied by the usual adhesive layer 146 backed by protective paper 147.

Protective barrier 150 shown in FIGS. 27 and 28 is designed primarily for application to narrow gaps occurring between surfaces which move relative one another on a longitudinal axis (see FIG. 28). Protective barrier 150 comprises a base having flanges 151 and 152. These flanges are connected one to the other by a generally circular housing cover 153. Intumescent mass 154 is located within closed cavity 155.

Adhesive layer 162 is applied to the lower surfaces of flange 151 and 152, and this adhesive layer is protected by paper backing 164.

Four small grooves 156, 157, 158 and 159 are formed on the inner wall of cover 153 so as to insure proper collapsing of protective barrier 150 in response to the relative closing movement of elements 160 and 161 with respect to each other (see FIG. 28).

When protective barrier 150 is subjected to excessive heat, the closed housing established by cover 153 is ruptured, and the characteristic intumescent foam will emerge from this housing to insure the integrity of the seal formed by the cover 153 in the gap defined between supports 160 and 161.

It should be noted that cavity 155 is only partially filled by intumescent mass 154 so that this mass is not disturbed during the normal closing of element 160 with respect to element 161.

What is claimed is:

1. A protective barrier against the products of combustion passing through a relatively narrow structural gap comprising a mechanical gasket fabricated of resilient and flexible material located in and sealing the gap in response to compression of the gasket, and a strip of intumescent coating located in the gap between a possible source for the products of combustion and the mechanical gasket and associated closely with the mechanical gasket to provide a foam insulating buffer layer for prolonging the integrity of the mechanical gasket in response to an elevated temperature due to combustion.

2. The combination of claim 1 in which a second strip of intumescent coating is also located in the gap and associated closely with the mechanical gasket with the gasket positioned between the two strips with either or both intumescent strips providing a foamed insulating layer for prolonging the integrity of the mechanical gasket in response to an elevated temperature due to combustion occurring from either or both sides of the mechanical gasket.

3. The combination of claim 1 in which the coating intumesces at a temperature lower than the temperature at which the gasket loses its mechanical integrity so that the strip provides a low temperature heat insulating seal for the mechanical gasket and also a seal for the products of combustion.

4. The combination of claim 2 in which both coatings intumesce at a temperature lower than the temperature at which the gasket loses its mechanical integrity so that both strips provide low temperature heat insulating seals for the mechanical gasket and also seals for the products of combustion.

5. A protective barrier for the products of combustion comprising a support, a mechanical gasket fabricated of pliable and resilient material carried by the support, and a strip of intumescent coating carried by the support and located between a possible source for the products of combustion and the mechanical gasket in close association with the mechanical gasket to provide a foam insulating buffer layer for prolonging the integrity of the mechanical gasket in response to an elevated temperature due to combustion.

6. The combination of claim 5 in which a second strip of intumescent coating is carried by the support in close association wtih the gasket with the gasket located between the two strips with either or both intumescent strips providing a foamed insulating layer for prolonging the integrity of the mechanical gasket in response to an elevated temperature due to combustion occurring from either or both sides of the mechanical gasket.

7. The combination of claim 5 in which the coating intumesces at a temperature lower than the temperature at which the gasket loses its mechanical integrity so that the strip provides a heat insulating seal for the mechanical gasket and also a seal for the products of combustion.

8. The combination of claim 6 in which both coatings intumesce at a temperature lower than the temperature at which the gasket loses its mechanical integrity so that both strips provide low temperature heat insulating seals for the mechanical gasket and also seals for the products of combustion.

9. The combination of claim 5 in which said support is a threshold.

10. The combination of claim 6 in which said support is a threshold.

11. The combination of claim 5 in which said support is a door jamb.

12. The combination of claim 6 in which said support is a door jamb.

13. The combination of claim 5 in which said support is a door or closure.

14. The combination of claim 6 in which said support is a door or closure.

15. The combination of claim 5 in which said support is a louver of a damper.

16. The combination of claim 6 in which said support is a louver of a damper.

17. The combination of claim 5 in which said support is a container or its movable cover.

18. The combination of claim 6 in which said support is a container or its movable cover.

19. In a combination with a closure movably mounted relative a jamb or door frame, the improvement comprising a mechanical gasket, fabricated of resilient and flexible material located in and sealing the air gap between the closure and the jamb or frame in response to compression of the gasket, and a strip of intumescent coating located in the gap between a possible source for the products of combustion and the mechanical gasket and supported closely adjacent the mechanical gasket so that the strip provides a heat insulating seal for prolonging the integrity of the mechanical gasket in response to an elevated temperature and also a seal for the products of combustion.

20. The combination of claim 19 in which a second strip of intumescent coating is supported in the air gap closely adjacent the mechanical gasket with the gasket between the two strips so that both strips provide heat insulating seals for prolonging the integrity of the mechanical gasket in response to elevated temperature occurring on either or both sides of the intumescent strips and also seals for the products of combustion.

21. The combination of claim 19 in which the closure is associated with a threshold with the mechanical gasket sealing the air gap between the bottom of the closure and the threshold with the strip of intumescent coating being also supported closely adjacent the portion of the gasket associated with the threshold.

22. A protective barrier against the products of combustion in which the protective barrier seals a relatively narrow structural gap defined by the two objects one of which is relatively movable with respect to the other to open the gap, comprising an elongated hollow resilient mechanical gasket located in the gap and supported on one of the objects to seal the structural gap by compression of the gasket, and a mass of intumescent coating housed within the otherwise hollow interior of the gasket to intumesce in response to an excessive temperature to reinforce and insure the integrity of the seal at those areas of the gasket which may disintegrate in response to the products of combustion and to generate an internal stiffening pressure in those areas of the gasket which do not disintegrate in response to the products of combustion.

23. The combination of claim 22 in which each increment of length of the gasket is only partially filled internally with the intumescent mass to enable the gasket to readily change shape to effect the seal between the two objects defining the gap.

24. The combination of claim 22 in which the resilient mechanical gasket comprises a pair of flexible lips which are in frictional contact with one another to form the hollow interior containing the intumescent mass.

25. A protective barrier against the products of combustion comprising a pliable body support formed to include an elongated resilient, compressible mechanical seal and a flexible flap adjacent the seal to define a first closed housing which is accessible by lifting the flap, and a mass of intumescent material contained within the housing defined by the flap to protect the seal by forming an insulating layer for the seal in the event of fire.

26. The combination of claim 25 including a second flap adjacent the seal with the seal between both flaps to define a second closed housing which is accessible by lifting the flap, and a second mass of intumescent material located in the second housing to protect the seal by forming an insulating layer for the seal in the event of fire.

References Cited

UNITED STATES PATENTS

| | | | |
|---|---|---|---|
| 2,898,634 | 8/1959 | Alderfer | 49—475X |
| 2,910,739 | 11/1959 | Snitker | 49—504 |
| 3,003,203 | 10/1961 | Grunwald | 49—469X |
| 3,024,504 | 3/1962 | Miller | 49—488 |
| 3,079,652 | 3/1963 | Wahlfeld | 49—469 |
| 3,274,734 | 9/1966 | Davis | 52—623X |
| 3,336,153 | 8/1967 | Juda | 220—88X |
| 3,386,209 | 6/1968 | Starcevic | 49—488X |
| 3,426,491 | 2/1969 | Gaeth et al. | 49—504X |

FOREIGN PATENTS

| | | | |
|---|---|---|---|
| 92,423 | 12/1961 | Denmark | 49—504 |
| 93,373 | 5/1962 | Denmark | 49—504 |
| 104,072 | 6/1964 | Norway | 49—504 |

DAVID J. WILLIAMOWSKY, Primary Examiner

P. C. KANNAN, Assistant Examiner

U.S. Cl. X.R.

49—504